United States Patent [19]

Deiglmeier

[11] Patent Number: 4,736,840
[45] Date of Patent: Apr. 12, 1988

[54] PROTECTIVE HOLDER FOR A COMPACT DISC OR THE LIKE

[76] Inventor: Jay D. Deiglmeier, 10670 N.E. 29th, #86 Bellevue, Wash. 98004

[21] Appl. No.: 934,472

[22] Filed: Nov. 24, 1986

[51] Int. Cl.$^4$ .............................................. B65D 85/57
[52] U.S. Cl. .................................. 206/313; 206/309; 206/815
[58] Field of Search ........................ 206/307, 309–313, 206/444, 804, 815; 229/68 R, 72; 360/133; 369/77.2

[56] References Cited

U.S. PATENT DOCUMENTS

| | | | |
|---|---|---|---|
| 1,498,577 | 6/1924 | Reinhold | 206/312 |
| 1,815,083 | 7/1931 | Weinberg | 206/815 |
| 1,842,728 | 1/1932 | Molins | 206/804 |
| 2,555,594 | 6/1951 | Markovitz | 206/309 |
| 2,931,557 | 4/1960 | Loderhose | 206/312 |
| 3,317,038 | 5/1967 | Bade et al. | 206/312 |
| 3,826,360 | 7/1974 | Shore | 206/312 |
| 3,987,900 | 10/1976 | Tadokoro et al. | 206/313 |
| 4,609,105 | 9/1986 | Manes et al. | |
| 4,627,531 | 12/1986 | Clemens | 206/312 |

FOREIGN PATENT DOCUMENTS

| | | | |
|---|---|---|---|
| 0555632 | 7/1932 | Fed. Rep. of Germany | 206/312 |
| 0771981 | 4/1957 | United Kingdom | 206/312 |

OTHER PUBLICATIONS

"Another Plastic CD Holder??", Trax, vol. 1, No. 5, Aug. 28–Sep. 10, 1986, p. 20.
"Take Them With You . . . Disc Wallet", Advertisement, Digital Audio (Magazine), p. 72, 2-1986.

Primary Examiner—Jimmy G. Foster
Attorney, Agent, or Firm—Graybeal, Jensen & Puntigam

[57] ABSTRACT

A protective holder for use with a compact disc or like object. The holder comprises relatively thin, substantially rigid upper and lower plates having diameters slightly larger than the diameter of the compact disc. The lower plate has a center hole having a diameter substantially equal to the diameter of the center hole of the compact disc. The upper plate has an elongated finger slot extending radially outwardly for a distance substantially equal to one-fourth the radius of the upper plate. A annular felt pad is affixed to an upper surface of the lower plate to cushion the information bearing lower surface of the compact disc when the compact disc is in place in the holder. A semi-circumferential peripheral wall extends between and is affixed to the upper and lower plates. The peripheral wall is dimensioned to suitably space said upper and lower plates to snugly receive and frictionally retain the disk therebetween. The peripheral wall is preferably formed from an upper lip extending downwardly from the upper plate and a lower lip extending upwardly from the lower plate, said upper and lower lips being affixed along their lengths to form the peripheral wall.

20 Claims, 2 Drawing Sheets

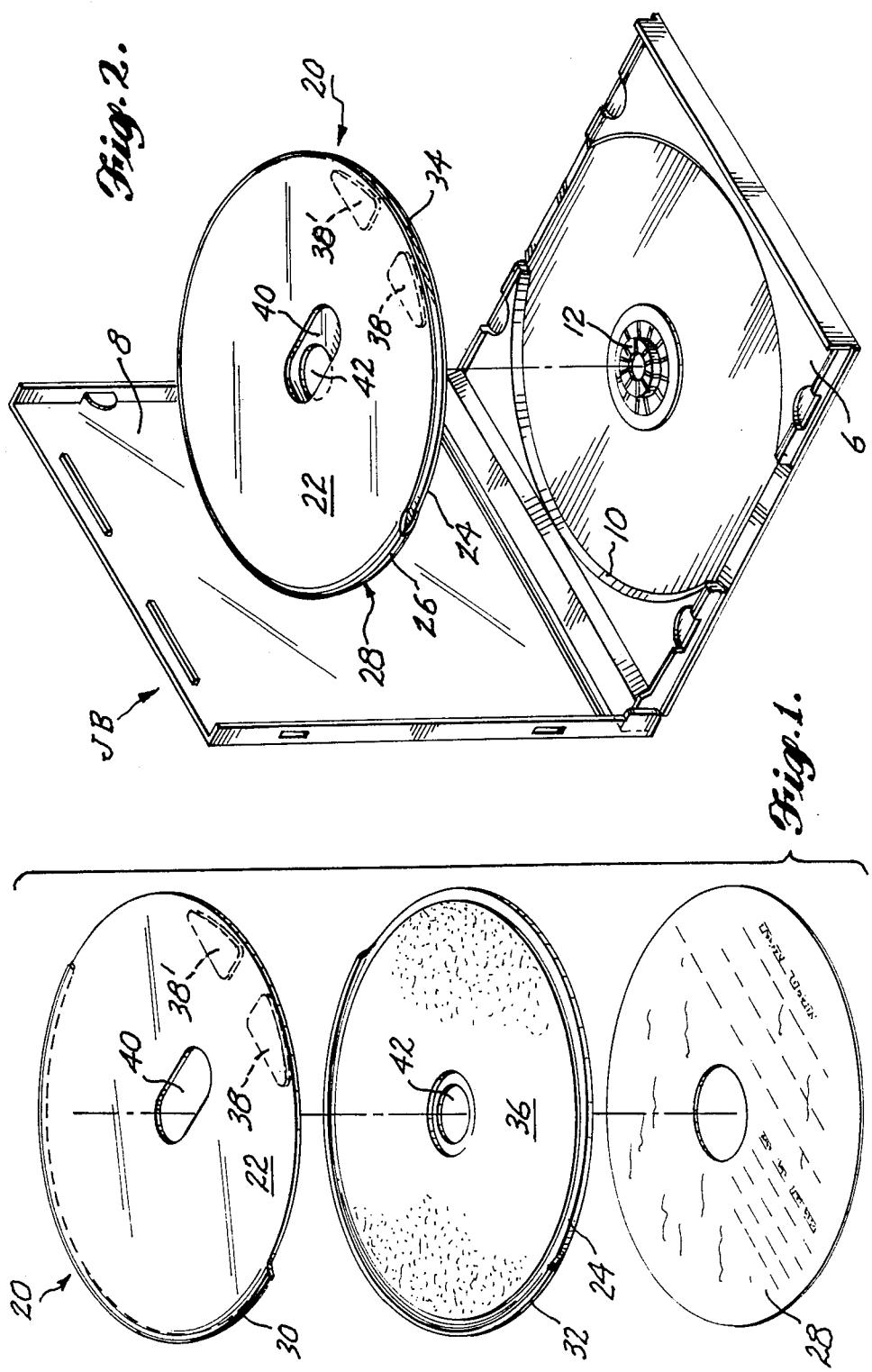

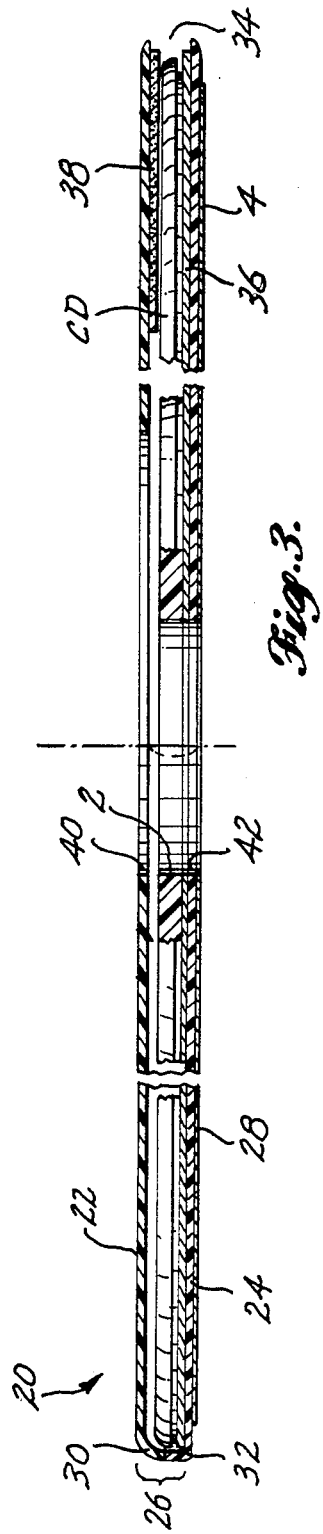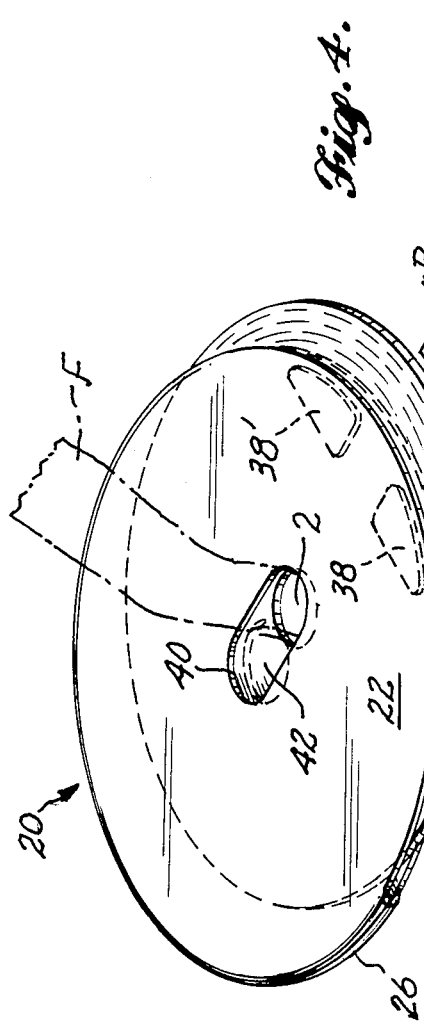

PROTECTIVE HOLDER FOR A COMPACT DISC OR THE LIKE

BACKGROUND OF THE INVENTION

1. Technical Field

This invention relates to protective holders or covers for thin disks. More particularly, the invention relates to protective holders or covers for information storage disks such as compact discs.

2. Description of the Prior Art

Compact discs are thin, circular information storage discs having optically retrievable information recorded in digital form on or in at least one surface thereof. Currently, conventional compact discs have only one information bearing surface. The present invention is described with reference to such singlesided compact discs, although the present invention is readily adaptable to and useful with double-sided compact discs. The information bearing surface of a compact disc comprises a thin optically reflective coating into which billions of microscopic pits are etched, each such pit representing one binary digit of recorded information. The information bearing surface of a compact disc may be damaged, and the information stored thereon destroyed, by abrasion and scratching resulting from improper storage or handling of the compact disc. The information stored on a single compact disc is often extremely valuable, warranting exceptional care to avoid damaging the information bearing surface of the compact disc. The present invention securely and positively protects compact discs from damage during storage and handling thereof.

Compact discs are conventionally marketed and stored in hinged storage containers or boxes which can retain one or more compact discs. A common conventional storage box is a substantially rectilinear plastic container known as a "jewel box". The jewel box encloses a shallow, substantially circular inner volume sized to receive and retain a compact disc. Typically the inner volume of the storage box is sized to be larger than a compact disc, both in diameter and in height, allowing the compact disc to move about within the box and thereby increasing the danger of damaging the information bearing surface of the compact disc.

Compact discs are increasingly being used with portable playing devices. In such portable use situations the compact disc is often carried and stored without the relatively bulky rectilinear storage box, and is handled much more frequently and roughly than in situation when the compact disc is used in a more protected environment. Portable play and use thus subjects compact discs to an increased danger of excessive wear and damage. Furthermore, the storage box and its liner notes often do not include information whcih the user may want to associate with the disc.

SUMMARY OF THE INVENTION

It is thus an object of the present invention to provide a holder for protecting a compact disc or like information bearing disk-like object from damage, such as can result from contact with foreign objects or with the inner surfaces of a conventional compact disc storage box. It is a further object of the this invention to provide a protective holder for a compact disc which includes means for preventing damaging contact between the surfaces of the compact disc and the protective holder itself. It is another object of this invention to provide a protective holder for a compact disc which together with a compact disc retained therein may be stored within a conventional compact disc storage box. It is yet another object of this invention to provide a protective holder for a compact disc which facilitates removal of the compact disc therefrom while exposing only a small portion of the surface of the compact disc when the compact disc is in place in the holder. It is yet another object of this invention to provide a protective holder for a compact disc which readily accepts an adhesively attachable label bearing pre-printed information and upon which the user may write additional information as desired.

These and other objects are provided by a protective holder comprising relatively thin, substantially rigid upper and lower plates having diameters no smaller than the diameter of a conventional compact disc or similar disk-like object. The upper and lower plates each have a center opening dimensioned no smaller than the center hole of the disk. The center opening of the upper plate preferably comprises an elongated, radially oriented slot. Cushioning means affixed to an upper surface of the lower plate engages and protects the information bearing lower surface of the compact disc when the disk is in place in the protective holder. A peripheral wall extends between and is affixed to substantially semi-circumferential peripheral portions of the upper and lower plates. The peripheral wall is dimensioned to suitable space said upper and lower plates to snugly receive and frictionally retain the disk therebetween.

Other features and advantages of the present invention will become apparent from the following detailed description of a typical embodiment thereof, taken in conjunction with the accompanying drawings.

BRIEF DESCRIPTION OF THE DRAWINGS

FIG. 1 is an exploded isometric view of a protective holder according to the present invention.

FIG. 2 is an isometric view of the protective holder of FIG. 1 and of a conventional compact disc storage box, drawn to the same scale.

FIG. 3 is a elevational cross-sectional view of the protective holder of FIG. 1 with a compact disc or like object inserted therein.

FIG. 4 is an isometric view of the protective holder and compact disc of FIG. 3, showing the use of the elongated finger slot for removing the compact disc from the holder.

DESCRIPTION OF THE PREFERRED EMBODIMENT

As best seen in FIGS. 1 and 3, the presently preferred embodiment of the protective holder 20 of this invention comprises a circular upper plate 22, a circular lower plate 24, a semi-circumferential peripheral connecting wall 26 therebetween, and a label 28 adhesively attached to the lower plate. The upper and lower plates 22,24 are circular disks of like diameter and thickness. As will be explained in further detail below, the diameter of the upper and lower plates 22,24 is preferably slightly greater than the diameter of a conventional compact disc, and the thickness of the upper and lower plates is preferably about 0.040 inch (about 1 mm).

The peripheral wall 26 joins the upper plate 22 to the lower plate 24 around one-half the circumferences thereof. As presently preferred, the peripheral wall 26 is formed by a semi-circumferential upper lip 30 and a corresponding semi-circumferential lower lip 32. The upper lip 30 is affixed to and depends downwardly from the upper plate 22. The lower lip 32 is affixed to and extends upwardly from the lower plate to join the upper lip 30. The upper lip 30 and lower lip 32 are fixedly attached to each other along their respective lengths to form the continuous semi-circumferential peripheral wall 26 which extends between and rigidly connects the upper plate 22 and the lower plate 24. When assembled, the upper and lower plates 22,24 and the peripheral wall 26 together define an interior volume between the plates sized to snugly receive and retain a conventional 4.7 inch (about 120 mm) diameter compact disc CD. A semicircumferential peripheral opening 34 opposite the peripheral wall 26 allows ready insertion of the compact disc CD into the interior volume between the plates 22,24 and subsequent removal of the compact disc therefrom.

The compact disc CD is securely protected when in place in the protective holder 20. The compact disc CD is a relatively thin, flat disk having a center hole 2 for engaging and being rotated by a spindle of a compact disc player, and an information bearing lower surface 4. The holder 20 is designed to receive the compact disc CD with the information bearing lower surface 4 of the compact disc proximate the lower plate 24. A felt or like lower pad 36 is affixed to the upper surface of the lower plate 24 across substantially the entire surface thereof to cushion the engagement between the information bearing lower surface 4 of the compact disc CD and the lower plate. The engagement between the upper surface of the compact disc CD and the upper plate 22 is less critical where the compact disc has only the single, lower information bearing surface described herein. Two relatively small felt or like upper pads 38,38' are affixed to the lower surface of the upper plate 22 near the periphery thereof adjacent the peripheral opening 34 between the plates. The upper pads 38,38' and the lower pad 36 of the protective holder 20 snugly secure the compact disc CD therebetween to retain the compact disc in place in the holder. The upper pads 38,38' cover only a relatively small portion of the lower surface of the upper plate 22 because the upper surface of the compact disc CD does not require the same protection as the information bearing lower surface 4 thereof. It will however be understood that in a protective holder for a double-sided disk or like object, substantially the entire lower surface of the upper plate would preferably be covered by a felt or like cushioning pad to protect the second information bearing surface of the disk or like object.

A principal feature of the protective holder 20 of this invention is that it is sized to fit within a conventional compact disc storage box. As best seen in FIG. 2, the conventional compact disc storage box JB, commonly known as a "jewel box", comprises a base 6 and a closely interfitting lid 8 hingedly attached to the base. A relatively shallow substantially circular depression 10 formed in the base 6 is sized to receive a compact disc. The diameter of the circular depression 10 is slightly greater than the diameter of the compact disc CD. The base 6 of the stroage box JB includes a center pedestal 12 centrally affixed to and standing upwardly from the bottom of circular depression 10 of the base 6. The upstanding center pedestal 12 of the storage box JB fits within the center hole 2 of the compact disc CD to centrally position the compact disc within the circular depression 10 of the storage box.

In order that the protective holder 20 will fit within conventional compact disc storage containers, the diameters of the upper and lower plates 22,24 are sized only slightly larger than the approximately 4.7 inch (about 120 mm) diameter of the compact disc CD and slightly smaller than the diameter of the circular depression 10 of the base 6 of the storage box JB. An elongated slot 40 and a center hole 42 open respectively through the centers of the upper and lower plates 22, 24. When the compact disc CD is placed in the protective holder 20, the center hole 2 of the protective disc is aligned between the slot 40 and the center hole 42 to form a continuous opening through the assembled holder 20 and compact disc CD. Thus when the protective holder 20 containing the compact disc CD is placed in the circular depression 10 in the base 6 of the storage box JB, the upstanding center pedestal 12 is received within the aligned central openings of the protective holder and the compact disc. In order that the lid 8 of the storage box JB will close over the protective holder 20 when the holder is in place within the storage box, the upper and lower plates 22,24 are relatively thin. As presently preferred, the upper and lower plates 22,24 are about 0.040 inch (about 1 mm) thick.

The compact disc CD is inserted into and removed from the protective holder 20 through the semi-circumferential peripheral opening 34 opposite the semicircumferential peripheral wall 26. Insertion of the compact disc CD into the holder 20 is accomplished by aligning one side edge of the compact disc with the peripheral opening 34 and manually pushing the opposite side edge of the compact disc to slide the compact disc edgewise into the holder. Removal of the compact disc CD from the holder 20 is facilitated by the elongated, central finger access slot 40 which opens through the upper plate 22. The finger slot 40 is sized with a minor dimension approximately equal to the diameter of the center hole 2 of the compact disc CD, so as to receive the center pedestal 12 of the base 6 of the storage box JB. The finger slot 40 extends from the center of the upper plate 22 radially outwardly along a major axis of the slot. The elongated finger slot 40 extends in the direction of the major axis of the slot from the center of the upper plate 22 radially outwardly toward the peripheral opening 34. The major axis of the finger slot 40 bisects the peripheral wall 26 in one direction, and bisects the peripheral opening 34 in the opposite direction. The dimension of the finger slot 40 along the major axis is about one fourth the radius of the upper plate 22, i.e. about 0.6 inch (about 16 mm). As will thus be apparent, and as shown in FIG. 4, the elongated finger slot 40 allows a user of the protective holder 20 of this invention to readily remove a compact disc CD therefrom by inserting his or her finger F through the elongated slot 40 of the upper plate 22 and into the center hole 2 of the compact disc CD, and sliding his or her finger F together with the compact disc engaged thereby radially outwardly along the slot 40 toward the peripheral opening 34 as indicated by arrow R in FIG. 4. It will be understood that finger access openings through the upper or lower plate might be provided in several different manners. However, the elongated slot 40 extending radially outwardly toward the peripheral opening 34 is preferred because is allows the user to remove the compact disc CD from the protective holder 20 by engaging only the center hole thereof without touching the either of the surfaces of the compact disc, and because it exposes only a small portion of the upper surface of the compact disc CD when the compact disc is in place in the protective holder 20.

The preferred embodiment of the protective holder 20 includes an information sheet or label 28 adhesively attachable to a lower surface of the lower plate 24. The label allows each compact disc CD to be retained within the holder 20 together with any desired identifying and explanatory information. Without the label 28 such information could not be carried with the compact disc CD except by also carrying the storage box JB or its liner notes. The label 28 is an annular sheet surrounding a center hole. The center hole in the label 28 prevents the label from covering the center hole 42 of the lower plate 24 and preventing placement of the protective holder over the center pedestal 12 of the base 6 of the compact disc storage box JB. The label 28 may advantageously include pre-printed information as well as providing blank writing space for the user of the holder 20.

It will be appreciated that, although specific embodiments of the invention have been described herein for purposes of illustration, various modifications may be made without departing from the spirit and scope of the invention. Accordingly, the scope of the invention is not limited except as by the following claims.

What is claimed is:

1. A protective holder for use with a thin substantially circular compact disc or like object having an upper surface, a lower surface to be protected, and a center hole, said protective holder comprising:
   (a) a relatively thin, substantially rigid lower plate having a diameter no smaller than the diameter of the compact disc, said lower plate having a center opening no smaller than the center hole of the compact disc, said center opening being symmetrical in at least two radial orientations;
   (b) cushioning means affixed to an upper surface of the lower plate for engaging the lower surface of the compact disc when the compact disc is in place in the protective holder;
   (c) a relatively thin, substantially rigid upper plate having a diameter no smaller than the diameter of the compact disc, said upper plate having a center hole; and
   (d) a peripheral wall extending between and affixed to a substantially semi-circumferential peripheral portion of the lower plate and a substantially semi-circumferential peripheral portion of the upper plate, said peripheral wall dimensioned to suitably space said upper and lower plates to snugly receive and frictionally retain the compact disc therebetween,
   the center hole of the upper plate being in the form of an elongated central slot extending outwardly from said peripheral wall, said slot having a minor dimension no smaller than the center hole of the compact disc and a major dimenison extending radially partly across the upper plate, said major axis bisecting the peripheral wall of the holder, and said elongated slot providing finger access to the compact disc for ready removal thereof from the protective holder.

2. A protective holder according to claim 1, wherein the elongated central slot has a major dimension equal to about one eighth of the diameter of the upper plate.

3. A protective holder according to claim 2, wherein the elongated central slot of the upper plate extends outwardly away from said peripheral wall.

4. A protective holder according to claim 1, wherein the center opening of the lower plate is circular with a diameter substantially equal to the diameter of the center hole of the compact disc.

5. A protective holder according to claim 1, wherein the peripheral wall comprises
   (a) a semi-circumferential peripheral upper lip affixed to and extending downwardly from the upper plate, and
   (b) a semi-circumferential peripheral lower lip affixed to and extending upwardly from the lower plate, said upper and lower lips being affixed to each other to form said peripheral wall.

6. A protective holder according to claim 1, further comprising second cushioning means affixed to a lower surface of the upper plate for engaging the upper surface of the compact disc when the compact disc is in place in the protective holder.

7. A protective holder according to claim 1, further comprising an adhesive backed sheet applicable to the lower surface of the lower plate.

8. A protective holder according to claim 1, wherein the holder is dimensioned so that the holder with a compact disc inserted therein can be placed entirely with a conventional storage box having a lid and a center pedestal such that the center pedestal of the storage box interfits through the center holes of the protective hodler and of the compact disc, and the lid of the storage box can be completely closed thereon.

9. A protective holder according to claim 1, wherein the diameter of said upper and lower plates is slightly greater than the diameter of the compact disc.

10. A protective holder for use with a thin substantially circular compact disc or like object having an upper surface, an information bearing lower surface, and a center hole, said compact disc being conventionally marketed and stored in a storage box in which the compact disc nests and is retained, said storage box having a center pedestal for frictionally interfitting the center hole of the compact disc, said protective holder comprising:
   (a) a relatively thin, substantially rigid lower plate having a diameter slightly greater than the diameter of the compact disc, said lower plate having a circular center hole having a diameter equal to or slightly greater than the diameter of the center hole of the compact disc;
   (b) cushioning means affixed to an upper surface of the lower plate for engaging the information bearing lower surface of the compact disc when the compact disc is in place in the protective holder.
   (c) a relatively thin, substantially rigid upper plate having a diameter slightly greater than the diameter of the compact disc, said upper plate including an elongated central slot having a minor dimension equal to or slightly greater than the diameter of the center hole of the compact disc and having a major dimension measured along a radially oriented major axis of the slot equal to about one eighth of the diameter of the upper plate; and
   (d) a peripheral wall extending between and affixed to a substantially semi-circumferential peripheral portion of the lower plate and a substantially semi-circumferential peripheral portion of the upper plate, said peripheral wall dimensioned to suitably space said upper and lower plates to snugly receive and frictionally retain the compact disc therebetween, said peripheral wall being bisected by the major axis of the elongated slot of the upper plate, wherein the compact disc is insertable and removable from the protective holder by edgewise movement through a peripheral opening between the lower and upper plates located opposite the peripheral wall, and wherein said elongated central slot extends outwardly away from said peripheral wall.

11. A protective holder according to claim 10, wherein the holder is dimensioned so that the holder with a compact disc in place therein can be placed in a lidded storage box and the lid thereof completely closed thereon.

12. A protective holder according to claim 10, wherein the peripheral wall comprises
   (a) a semi-circumferential peripheral upper lip affixed to and extending downwardly from the upper plate, and
   (b) a semi-circumferential peripheral lower lip affixed to and extending upwardly from the lower plate, said upper and lower lips being bonded to each other to form said peripheral wall.

13. A protective holder according to claim 10, further comprising second cushioning means affixed to a lower surface of the upper plate for engaging the upper surface of the compact disc when the compact disc is in place in the protective holder.

14. A protective holder according to claim 10, further comprising an adhesive backed sheet applicable to the lower surface of the lower plate.

15. A protective holder according to claim 10, wherein said upper and lower plates and said peripheral wall are substantially transparent or translucent.

16. A protective holder according to claim 15, wherein said upper and lower plates and said peripheral wall are formed essentially of injection molded polyurethane resin.

17. A protective holder for use with a thin substantially circular compact disc having an upper surface, an information bearing lower surface, and a center hole, said compact disc being conventionally marketed and stored in a storage box in which the compact disc nests and is retained, said storage box having a base, a lid and a center pedestal for frictionally interfitting the center hole of the compact disc, said protective holder comprising:
   (a) a relatively thin, substantially rigid lower plate having a diameter equal to or slightly greater than the diameter of the compact disc, said lower plate having a circular center hole having a diameter substantially equal to the diameter of the center hole of the compact disc, said lower plate including a semi-circumferential peripheral lower lip affixed to and extending upwardly from the lower plate;
   (b) cushioning means affixed to an upper surface of the lower plate for engaging the information bearing lower surface of the compact disc when the compact disc is in place in the protective holder;
   (c) a relatively thin, substantially rigid upper plate having a diameter equal to or slightly greater than the diameter of the compact disc, said upper plate including
      (i) a semi-circumferential peripheral upper lip affixed to and extending downwardly from the upper plate, the distal edges of the upper and lower lips being bonded together to form a substantially semi-circumferential peripheral wall extending between and joining said upper plate and said lower plate, said upper and lower lips being dimensioned to suitably space said upper and lower plates to snugly receive and frictionally retain the compact disc therebetween, and
      (ii) an elongated central slot extending outwardly away from said peripheral wall and having a minor dimension substantially equal to the diameter of the center hole of the compact disc and having a major dimension measured along a radially oriented major axis equal to about one eighth of the diameter of the upper plate, said major axis bisecting the peripheral wall of the holder; and
   (d) second cushioning means affixed to a lower surface of the upper plate for engaging the upper surface of the compact disc when the compact disc is in place in the protective holder,
   wherein the compact disc is insertable and removable from the protective holder by edgewise movement of the compact disc through a peripheral opening between the lower and upper plates located opposite the peripheral wall.

18. A protective holder according to claim 17, further comprising an adhesive backed sheet applicable to the lower surface of the lower plate.

19. A protective holder according to claim 17, wherein said upper and lower plates and said peripheral wall are substantially transparent or translucent.

20. A protective holder according to claim 18, wherein said upper and lower plates and said peripheral wall are formed essentially of injection molded polyurethane resin.

* * * * *